US009286533B2

(12) United States Patent
Tsai et al.

(10) Patent No.: US 9,286,533 B2
(45) Date of Patent: Mar. 15, 2016

(54) METHOD FOR IMAGE RECOMBINATION OF A PLURALITY OF IMAGES AND IMAGE IDENTIFICATION AND SYSTEM FOR IMAGE ACQUIRING AND IDENTIFICATION

(71) Applicant: INDUSTRIAL TECHNOLOGY RESEARCH INSTITUTE, Hsinchu (TW)

(72) Inventors: Ya-Hui Tsai, Pingjhen (TW); Kuo-Tang Huang, Pingjhen (TW); Chun-Lung Chang, Hsinchu (TW); Lai-Sheng Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/561,604

(22) Filed: Dec. 5, 2014

(65) Prior Publication Data
US 2015/0086135 A1    Mar. 26, 2015

Related U.S. Application Data

(62) Division of application No. 12/512,628, filed on Jul. 30, 2009, now abandoned.

(51) Int. Cl.
*G06K 9/32* (2006.01)
*G06K 9/72* (2006.01)
*G06K 9/46* (2006.01)
*G06T 11/60* (2006.01)

(52) U.S. Cl.
CPC .............. *G06K 9/325* (2013.01); *G06K 9/3258* (2013.01); *G06K 9/4604* (2013.01); *G06K 9/72* (2013.01); *G06T 11/60* (2013.01); *G06K 2209/01* (2013.01); *G06K 2209/15* (2013.01)

(58) Field of Classification Search
None
See application file for complete search history.

(56) References Cited

U.S. PATENT DOCUMENTS

| 4,817,166 | A | 3/1989 | Gonzalez et al. |
| 5,081,685 | A | 1/1992 | Jones, III et al. |
| 5,332,968 | A | 7/1994 | Brown |
| 5,425,108 | A | 6/1995 | Hwang et al. |
| 5,657,362 | A | 8/1997 | Giger et al. |

(Continued)

FOREIGN PATENT DOCUMENTS

| CN | 1268234 A | 9/2000 |
| TW | 123259 | 11/1989 |

(Continued)

OTHER PUBLICATIONS

Taiwan Patent Office, Office Action Issued on Jul. 30, 2012.

(Continued)

*Primary Examiner* — Tsung-Yin Tsai
(74) *Attorney, Agent, or Firm* — Rabin & Berdo, P.C.

(57) ABSTRACT

The present invention provides a method for image recombination of a plurality of images and image identification and a system for image acquiring and identification. Features with respect to the plurality of images are recombined and enhanced so as to form a recombined image. After that, the recombined image is processed to emphasize the features of the recombined image so that the recombined image is capable of being identified easily. Furthermore, the present provides a system to perform the foregoing method, whereby reducing unidentified problems caused due to low quality image of the monitoring system.

11 Claims, 16 Drawing Sheets

(56) References Cited

U.S. PATENT DOCUMENTS

| | | | |
|---|---|---|---|
| 6,473,517 B1 | 10/2002 | Tyan et al. | |
| 6,553,131 B1 * | 4/2003 | Neubauer | G06K 9/32 382/105 |
| 6,766,038 B1 * | 7/2004 | Sakuma | G01P 3/806 340/933 |
| 7,676,091 B2 * | 3/2010 | Zwirn | G06T 5/40 382/182 |
| 7,689,038 B2 * | 3/2010 | Zahniser | G06K 9/342 382/133 |
| 7,881,532 B2 | 2/2011 | Zahniser | |
| 8,265,368 B2 | 9/2012 | Ihara | |
| 2003/0068074 A1 * | 4/2003 | Hahn | G06K 9/342 382/128 |
| 2005/0238229 A1 * | 10/2005 | Ishidera | G06K 9/325 382/165 |
| 2007/0058863 A1 * | 3/2007 | Boregowda | G06K 9/3258 382/170 |
| 2007/0242900 A1 | 10/2007 | Chen et al. | |
| 2008/0123945 A1 * | 5/2008 | Andrew | G06K 9/00456 382/164 |
| 2009/0022403 A1 * | 1/2009 | Takamori | G06T 7/2006 382/195 |
| 2009/0225189 A1 * | 9/2009 | Morin | H04N 5/345 348/229.1 |
| 2010/0189367 A1 * | 7/2010 | van der Merwe | G06K 9/183 382/217 |

FOREIGN PATENT DOCUMENTS

| | | |
|---|---|---|
| TW | 191905 | 10/1992 |
| TW | 221193 | 2/1994 |
| TW | 226454 | 7/1994 |
| TW | 197752 | 3/2004 |
| TW | 200509673 A | 5/2005 |
| TW | I286027 | 8/2007 |
| TW | 200802137 | 1/2008 |
| TW | 200915240 A | 4/2009 |
| TW | 200731144 | 8/2012 |

OTHER PUBLICATIONS

China Patent Office, Office Action Issued on Dec. 23, 2011.

* cited by examiner

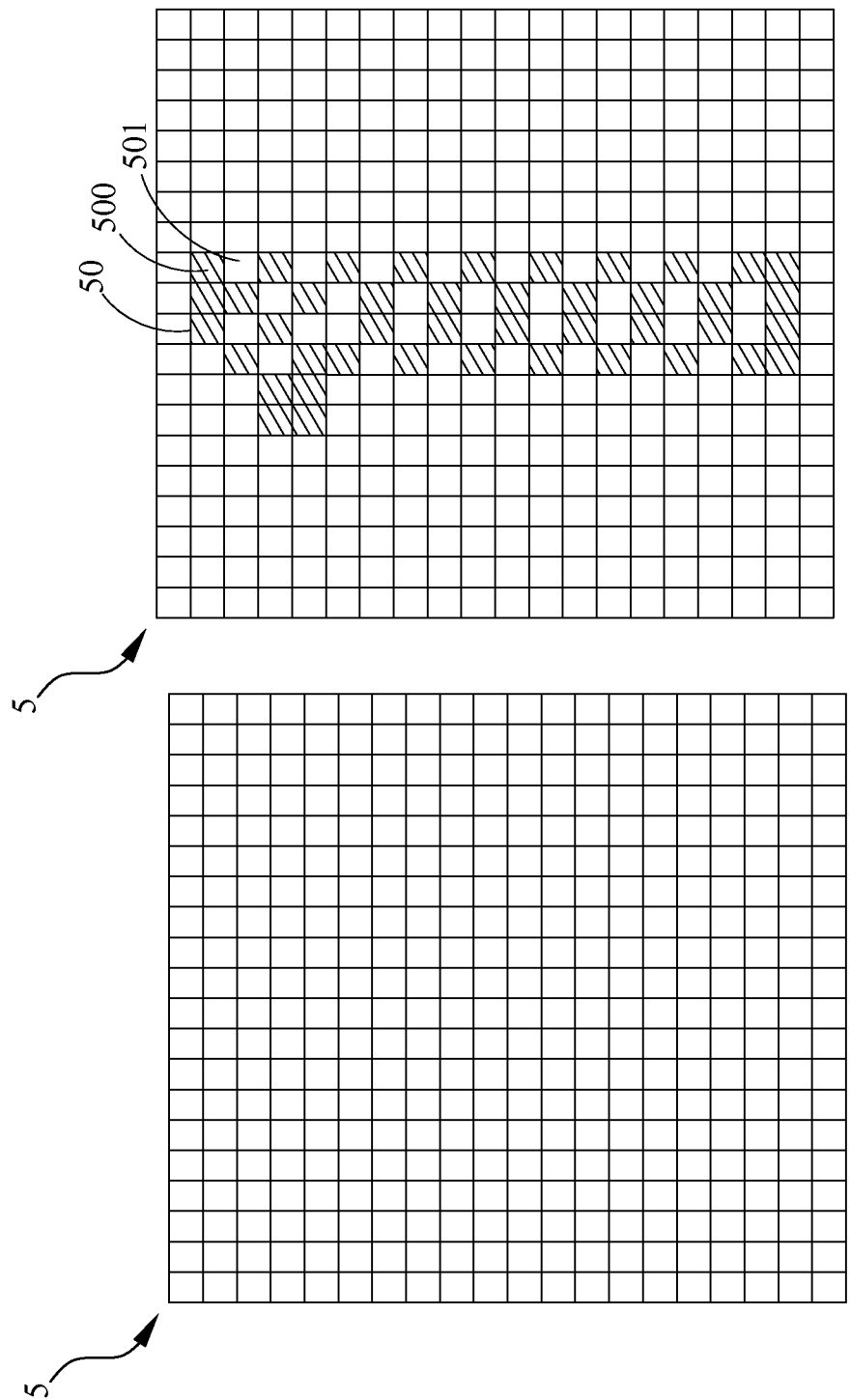

|  | | 6 | 0 | 9 | 5 | - | O | A |
|---|---|---|---|---|---|---|---|---|
| 1st Possible Result | Character | 6 | 0 | 9 | 5 | - | O | A |
| | Similarity Index | 72 | 52 | 67 | 72 | | 63 | 76 |
| 2nd Possible Result | Character | 8 | 6 | 5 | 9 | - | U | B |
| | Similarity Index | 16 | 41 | 62 | 40 | | 50 | 54 |
| 3rd Possible Result | Character | 9 | 8 | 8 | 3 | - | Q | N |
| | Similarity Index | 14 | 30 | 45 | 37 | | 45 | 45 |
| 4th Possible Result | Character | 3 | 4 | 0 | 0 | - | L | X |
| | Similarity Index | 0 | 24 | 36 | 18 | | 43 | 43 |

FIG.11

METHOD FOR IMAGE RECOMBINATION OF A PLURALITY OF IMAGES AND IMAGE IDENTIFICATION AND SYSTEM FOR IMAGE ACQUIRING AND IDENTIFICATION

The present application is a Divisional Application of co-pending U.S. application Ser. No. 12/512,628, filed on Jul. 30, 2009, which claims priority from the Taiwan Application No. 098114328, filed on Apr. 30, 2009, which is herein incorporated by reference.

FIELD OF THE INVENTION

The present invention generally relates to an image identification technology and, more particularly, to a method for image recombination of a plurality of images and image identification and a system for image acquiring and identification, wherein features with respect to the plurality of images are recombined so as to identify the content of an image.

BACKGROUND OF THE INVENTION

There are many people who get killed in traffic accidents. Theft and burglary using cars/motorcycles have been repeatedly reported. These may be attributed to poor image identification of license plates because of poor monitoring systems. Such monitoring systems are mostly problematic because of poor resolution (320×240 Pixels) and slant angles of the image acquiring units to cause blur or incomplete images that cannot be recognized so that the criminals can be at large.

Conventionally, in Taiwan Patent No. 197752, a CCD camera and an image acquiring unit are used to acquire a car image in the car lane and the car image is then read by an image reading unit. Then, a logarithmic greyscale operation unit is used to calculate the logarithmic greyscale of each pixel in the car image. The image corresponding to the logarithmic greyscales is decomposed by a wavelet decomposition unit into rough images, horizontally differentiated images, vertically differentiated images and diagonally differentiated images. An image binarization unit converts the logarithmic greyscale of each pixel in the horizontally differentiated images from real numbers into binary digits 0 and 1. A rough image dividing unit determines a region with the highest sum of binary digits within the whole car image according a pre-set license plate size and thus the region is initially referred to as a license plate region. Then, a license plate slantness correction unit corrects the slantness of the image corresponding to the license plate region. Finally, a fine image dividing unit removes the part that does not correspond to the license plate from the rough license plate region.

Moreover, in Taiwan Patent Pub. No. 1286027, an integrated plurality of lane free flow vehicle enforcement system is disclosed, wherein a portal framed equipment is established at the image enforcement point. The car lane is physically divided so that image enforcement can be realized with respect to various cars even though the system slows the cars to pass by the image enforcement point at a normal speed and to change lanes freely.

Moreover, in Taiwan Patent Appl. No. 200802137, a serial license plate identification system is disclosed, using a license plate character region detection module to receive an image and determine each approximate license plate range in the image. Sequences of serial identical pixels in each approximate license plate range are obtained. The sequences of serial identical pixels are erased, filtered, and connected to blocks so as to obtain the image with respect to the license plate character region in each approximate license plate range and output verified image with respect to the license plate character region after verification. Then, the verified image with respect to the license plate character region is transmitted to the a license plate character dividing and identification module to acquire all the independent character images and thus all the license plate character information after the independent character images are identified.

Moreover, Taiwan Patent No. 221193 discloses a license plate identification and monitoring apparatus used in a parking area. When a car passes by a pre-determined image acquiring spot, the host is informed to enable the duplex image acquiring device to control the camera device to acquire the car license plate image, which is then processed by the an identification process to identify the characters on the license plate for car management, stolen car seeking and prevention in the parking area.

Taiwan Patent No. 226454 discloses a license plate identification method, wherein the logic relation and character strokes are used to determine the correct license plate location in the digital image. Then, ternarized difference and fuzzy inference are used to acquire the outlines of the characters on the license plate. Adaptive binarization method is used to divide the boundaries of each character. Finally, the identification result can be obtained by a feature fused median calculation using a neural network.

Moreover, Taiwan Patent No. 191905 discloses a automatic mobile license plate identification system, which comprises an image acquiring device and an image processing device that can be installed in a car to perform automatic identification on a static or moving car being monitored. The image acquiring device is capable of acquiring the image of the license plate and transmitting the image into the image processing device. The image processing device performs a precise acquiring process on the license plate characters based on fuzzy inference and performs a character identification process on the characters using character structure analysis. Therefore, identification errors due to license plate contamination, bending, character contamination or deflexion can be prevented.

Taiwan Patent No. 123259 discloses a license plate number identification apparatus installed at a spot where cars pass by so as to automatically identify the license plate number of a car. The license plate number identification apparatus uses an image acquiring device capable of acquiring an image containing the license plate and an image processing unit capable of checking the digital image according to features of the license plate number to find the license plate location, specify the range of characters, divide the characters to achieve feature identification of each characters.

Moreover, U.S. Pat. No. 4,817,166 discloses a method for reading a license plate by acquiring the boundary features such as length, height, and width of the characters on the license plate. With such information regarding the character features, geometric features of the characters such as the locations and shapes of convex hulls, turns and holes are analyzed. Finally, the structure of each character on the license plate is analyzed according to the results of the aforegoing analysis.

Moreover, U.S. Pat. No. 6,553,131 discloses an identification technology using a smart image acquiring device to perform license plate identification. A processor is installed inside the image acquiring device to perform license plate information identification. In this technology, image identification is implemented by determining a base line according to the brightness and location of the license plate image and a blur region. The image having a base line is then processed by projection to obtain the location of each character on the license plate. A statistic-based method is used so that each character is provided with a confidence index. Finally, character information on the license plate is determined according to the confidence index.

Moreover, U.S. Pat. No. 5,425,108 discloses a license plate image identification technology, wherein the acquired license plate image is processed by fuzzy interfere and the features of the license plate image is identified by structure analysis using a neural network features.

Moreover, U.S. Pat. No. 6,473,517 discloses a license plate identification technology, wherein the license plate image is identified by character segmentation. In this technology, the license plate image is divided into a plurality of regions to be converted into possible character regions (or suspected character regions). Then, the possible character regions are identified to obtain a confidence index for image identification based thereon.

U.S. Pat. No. 5,081,685 discloses a license plate identification technology, wherein image intensity information is used to identify the characters on the license plate. In this technology, the characters are separated from the background on the license plate so as to obtain the outlines of the characters by a tracking process.

SUMMARY OF THE INVENTION

The present invention provides a method for image recombination of a plurality of images and image identification and a system for image acquiring and identification, wherein a plurality of images corresponding to a specific target are recombined to compensate the incomplete information of each image to form a recombined image with enhanced image identification.

The present invention provides a method for image recombination of a plurality of images and image identification and a system for image acquiring and identification, wherein a recombined image formed by recombining a plurality of images is identified with a plurality of similarity indexes according to the provided information in a database. The possible results are obtained according to the similarity indexes for the user to choose from with enhanced identification speed and precision.

The present invention provides a method for image recombination of a plurality of images and image identification and a system for image acquiring and identification, which is useful in identification on the identification mark of a carrier. With enhanced character features of the identification mark, multi-angle license plate identification technology can be used to help the user to identify cars that are suspected to cause accidents.

In one embodiment, the present invention provides a method for image recombination of a plurality of images, comprising steps of: acquiring a plurality of images; determining a region of interest in an image from the plurality of images and acquiring features in the region of interest; acquiring from other regions a feature region corresponding to the region of interest according to the acquired features; and performing an image recombination process to form a recombined image according to a plurality of feature regions and the region of interest.

In another embodiment, the present invention provides a method for image identification, comprising steps of: acquiring a plurality of images; determining a region of interest in an image from the plurality of images and acquiring features in the region of interest; acquiring from other regions a feature region corresponding to the region of interest according to the acquired features; and performing an image recombination process to form a recombined image according to a plurality of feature regions and the region of interest; and identifying the recombined image.

In another embodiment, the present invention provides a system for image acquiring and identification, comprising: an image input unit capable of providing a plurality of images; an image processing unit coupled to the image input unit, the image processing unit further comprising: a feature acquiring unit capable of acquiring features in a region of interest on an image from the plurality of images and acquiring from other regions a feature region corresponding to the region of interest according to the acquired features in other regions; a recombination unit capable of performing an image recombination process according to the plurality of feature regions and the region of interest to form a recombined image.

BRIEF DESCRIPTION OF THE DRAWINGS

The objects and spirits of the embodiments of the present invention will be readily understood by the accompanying drawings and detailed descriptions, wherein:

FIG. 9A to FIG. 9D are schematic diagrams showing the formation of a sample image;

FIG. 11 is a table for sorting the comparison results of an identification mark according to the present invention.

DETAILED DESCRIPTION OF THE PREFERRED EMBODIMENT

The present invention can be exemplified but not limited by various embodiments as described hereinafter.

Figure 1:
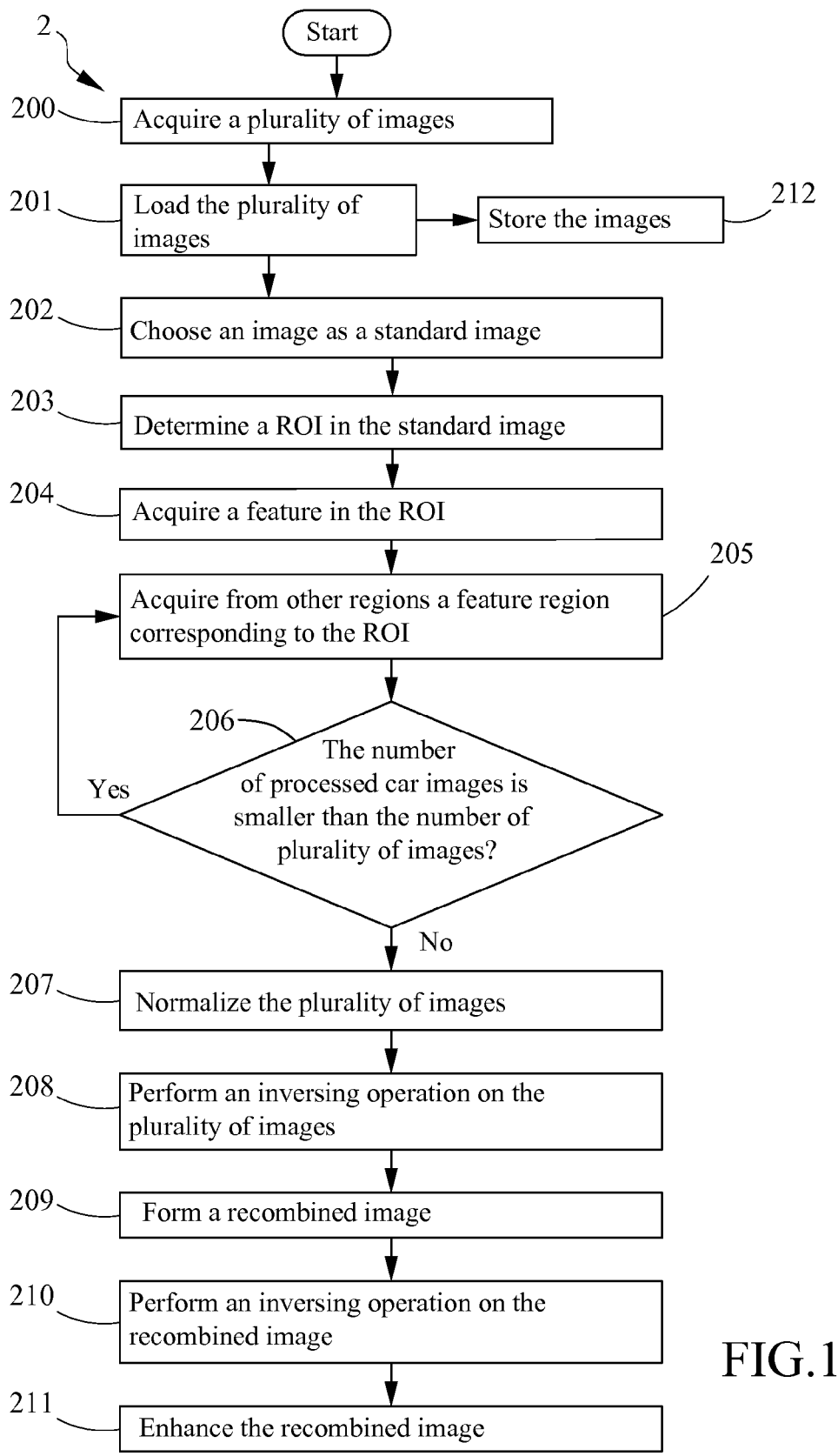
FIG. 1 is a flowchart of a method for image recombination of a plurality of images according to one embodiment of the present invention.
Figure 2A:
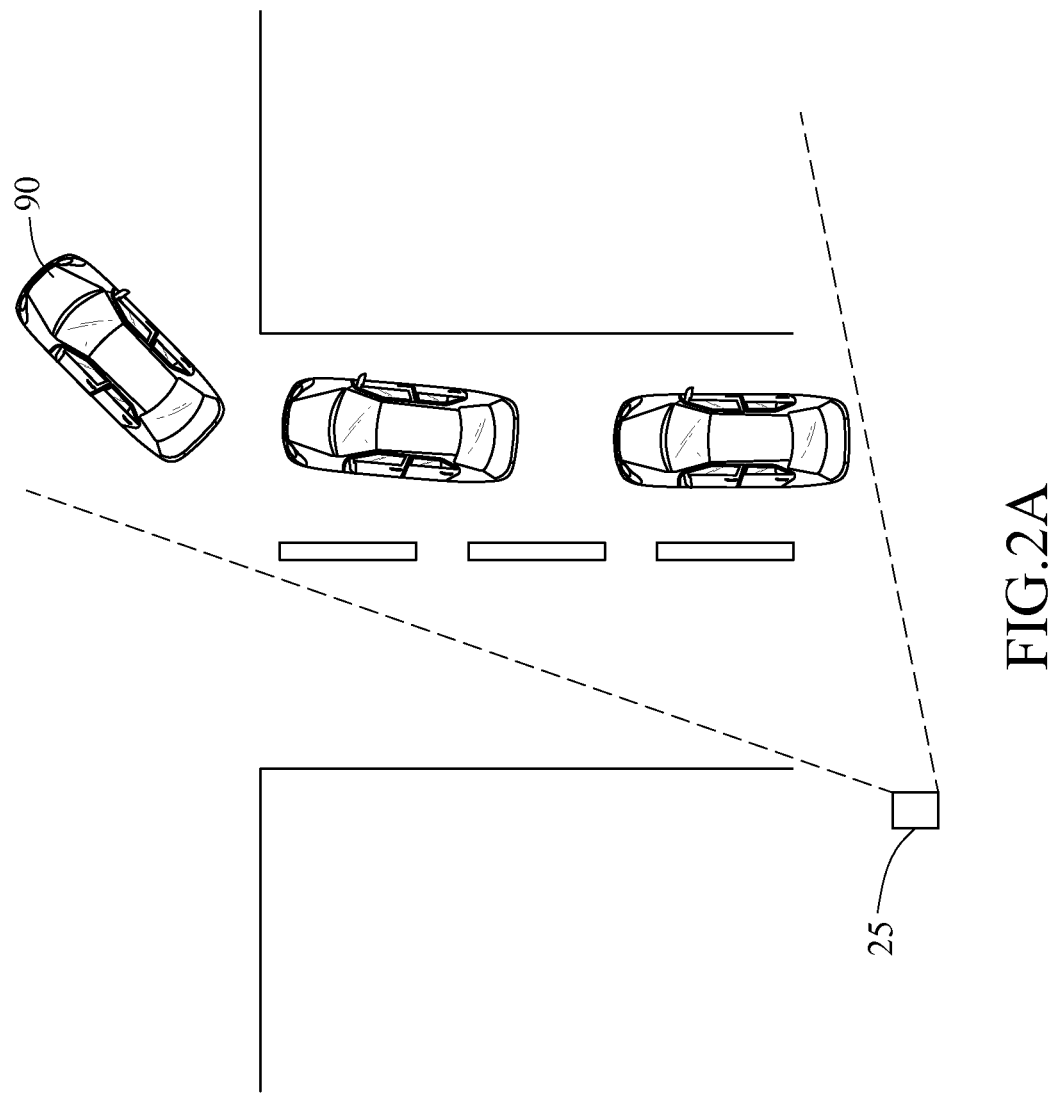
FIG. 2A and FIG. 2B are schematic diagrams showing a car that is moving.
Figure 2B:
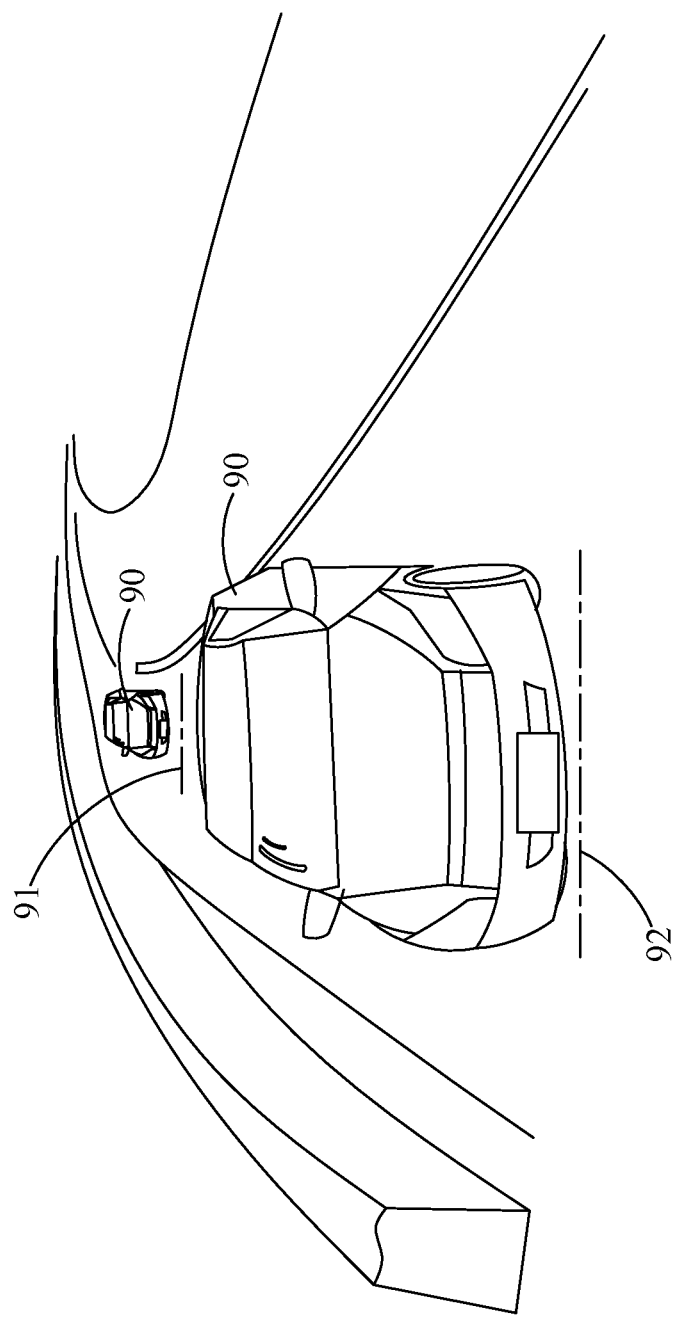
Figure 3A:
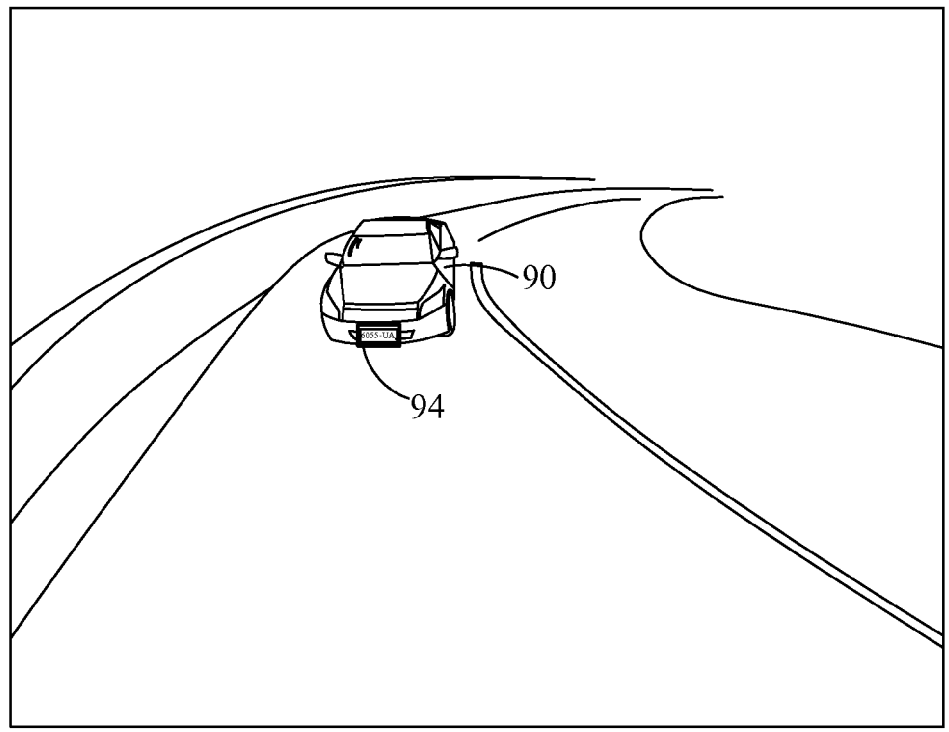
FIG. 3A and FIG. 3B are schematic diagrams showing the acquired images of a car at different locations.
Figure 3B:
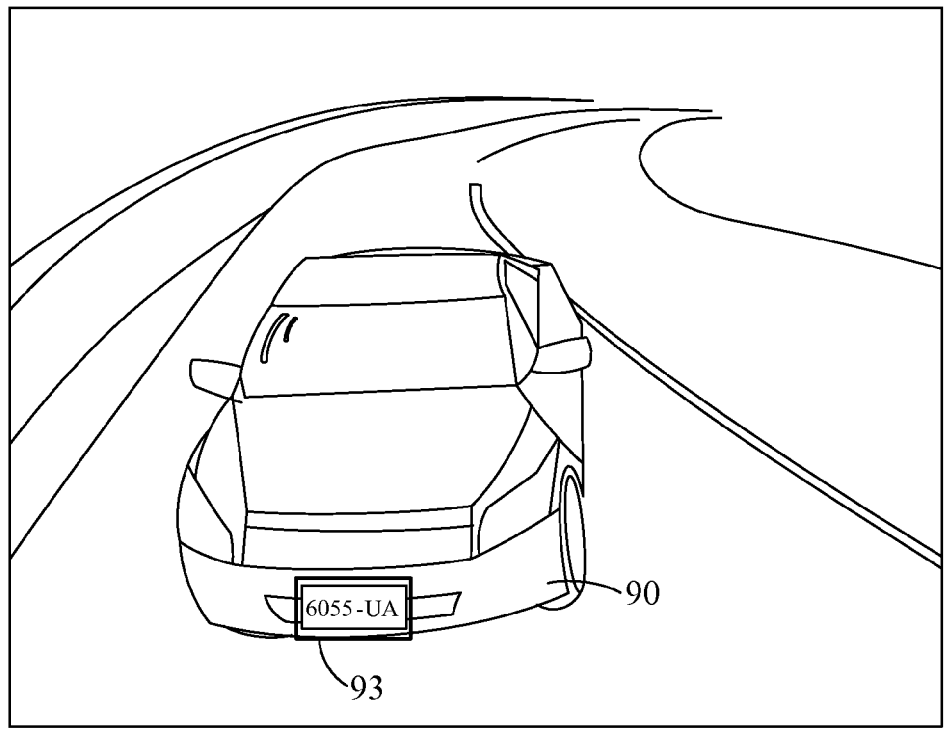

Please refer to FIG. 1, which is a flowchart of a method for image recombination of a plurality of images according to one embodiment of the present invention. In the present embodiment, the method 2 starts with step 200 to acquiring a plurality of images. In the present step, the plurality of images can be acquired in many ways, for example, inputting a plurality of images or using a camera, a CCD or a CMOS image acquiring unit, but not limited thereto, to acquire the plurality of images at different timings or using an image acquiring device to acquire images with sequential relation from continuous images by a camera. In FIG. 2A, when a car 90 is making a turn, images of the car 90 are acquired at different timings by an image acquiring unit 25 to acquire a plurality of images. In FIG. 2B, images at different locations are acquired when the car 90 is moving. For example, the image at location 91 is as shown in FIG. 3A, while the image at location 92 is as shown in FIG. 3B. The number of the images is based on the practical demand, and is thus not limited. In step 200, the images are images of a car, but not limited thereto.

Referring to FIG. 1, after the images are acquired, step 201 is performed to load the plurality of images. Then, in step 212, the images are stored in a storage medium, such as a hard disk or memory. Then step 202 is performed to choose from the plurality of images an image as a standard image. The chosen image can be the clearest one to be the standard image. In the embodiment, the standard image is as shown in FIG. 3B. Then, step 203 is performed to determine a region of interest (ROI) in the standard image. The region of interest covers the license plate image of a car, as shown in region 93 in FIG. 3B. Then, step 204 is performed to acquire the image features in the region of interest. In the present embodiment, the image features include contrast or greyscale value of the outlines of the word or digit on the license plate image in the feature region.

Figure 3C:
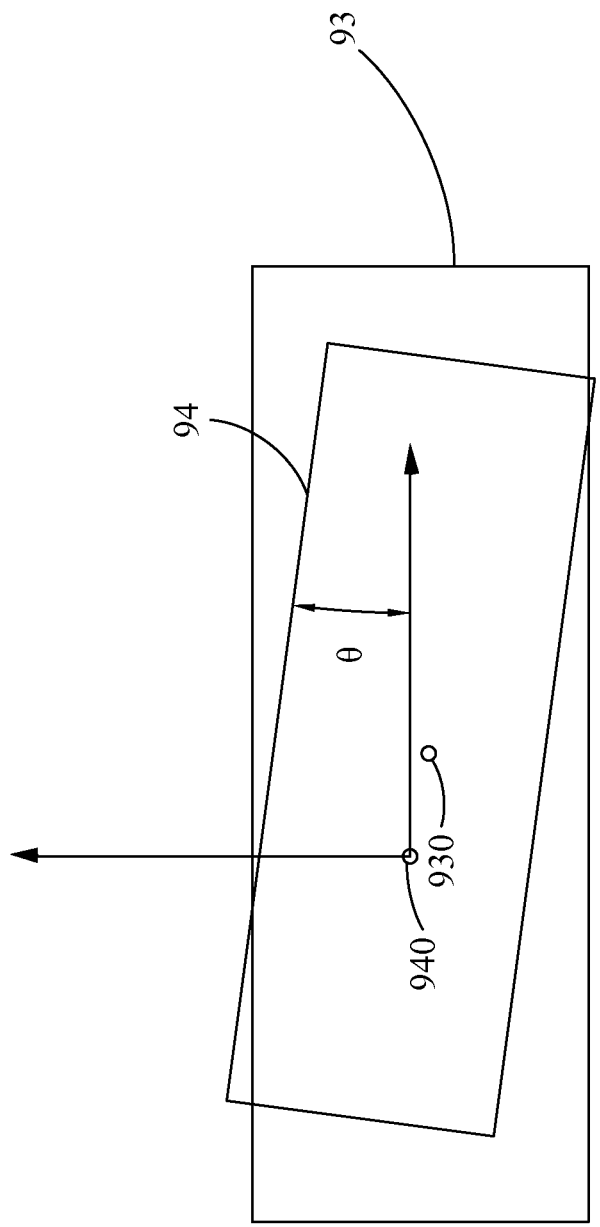
FIG. 3C is a schematic diagram showing the angular relation with respect to the feature region and the region of interest.

Then, step 205 is performed to acquire from other regions a feature region corresponding to the ROI according to the features acquired in step 204. The feature region is acquired manually or automatically with the use of software. The feature region is determined according to the object to be identified. In the present embodiment, an identification mark of a car is used as an example. The feature region refers to a region corresponding to the identification mark. Step 205 comprises two steps as described herein. Firstly, the image stored in step 212 is read. Then, the features acquired in step 204 are loaded to perform a feature searching process on the loaded images. For example, a feature region 94 can be searched from the image in FIG. 3A according to features acquired in region 91 in FIG. 3B. In step 205, in addition to acquiring the feature region, the angular relation and the scale relation between the feature region and the region of interest are also determined. For example, in FIG. 3C, after the feature region 94 is acquired, step 25 further acquires a location 940 in the feature region 94 corresponding to a spot 930 in the region of interest by geometric matching. Then, according to the location 940, the angular relation based on the coordinates of the feature region 94 is obtained. Furthermore, normalization can be achieved based on the angular relation (θ) and scale relation between the feature region 94 and the region of interest 93.

Referring to FIG. 1, in step 206, the feature region in other images is acquired repeatedly until the number of processed car images reaches the number of plurality of images. Afterwards, step 207 is performed to normalize the acquired feature regions. The step of normalization is performed according to the angular relation and the scale relation in step 205 so that the size of each feature region is adjusted to be identical to the size of the region of interest or that the sizes of the feature region and the region of interest are adjusted to a specific scale. Since there are a plurality of images acquired in step 200, the size of the target (i.e., a car in the present embodiment) may vary, as shown in FIG. 3A and FIG. 3B, due to different view angles and distances. As a result, the feature regions 93 and 94 acquired in step 205 may differ in size. Therefore, step 207 is performed to adjust the size of each feature region to be identical. In the present embodiment, the size is 130×130 pixels.

Figure 4A:
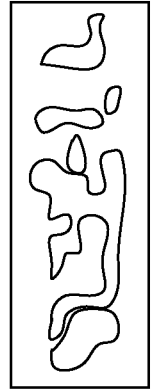
FIG. 4A and FIG. 4B are schematic diagrams of a plurality of images and a recombined image respectively.
Figure 4A:
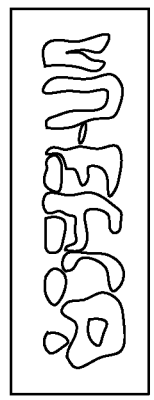
Figure 4A:
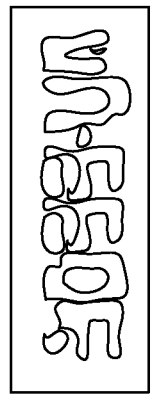
Figure 4B:
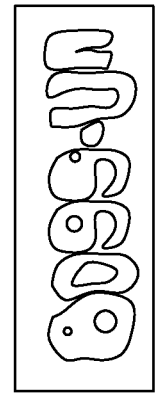

Then, step 208 performs an inversing operation on the pixels in the plurality of feature regions and the pixels in the region of interest respectively. The inversing operation is achieved so that the bright turns dark and the dark turns bright. The sensitivity of human eyes is saturated in a bright environment, which leads to failure in identifying the detailed structure in the bright region. Therefore, it is easier to identify the images after the inversing operation is performed to turn the bright into dark. Afterwards, step 209 is performed to form a recombined image by summing the pixels in the plurality of feature regions and the pixels in the region of interest. Since the feature region and the region of interest have been normalized to have the same image size, the greyscale values of the pixels can be summed. In step 210, an inversing operation is performed on the recombined image. Then, step 211 is performed to enhance the recombined image. The image is enhanced to improve the contrast and the brightness. Referring to FIG. 4A and FIG. 4B, FIG. 4A shows unidentified feature regions on a plurality of images (3 images in the present embodiment) before recombination while FIG. 4B is a schematic diagram of a recombined image by the method shown in FIG. 1. In other words, the 3 images in FIG. 4A are recombined to obtain a clear image.

Figure 5:
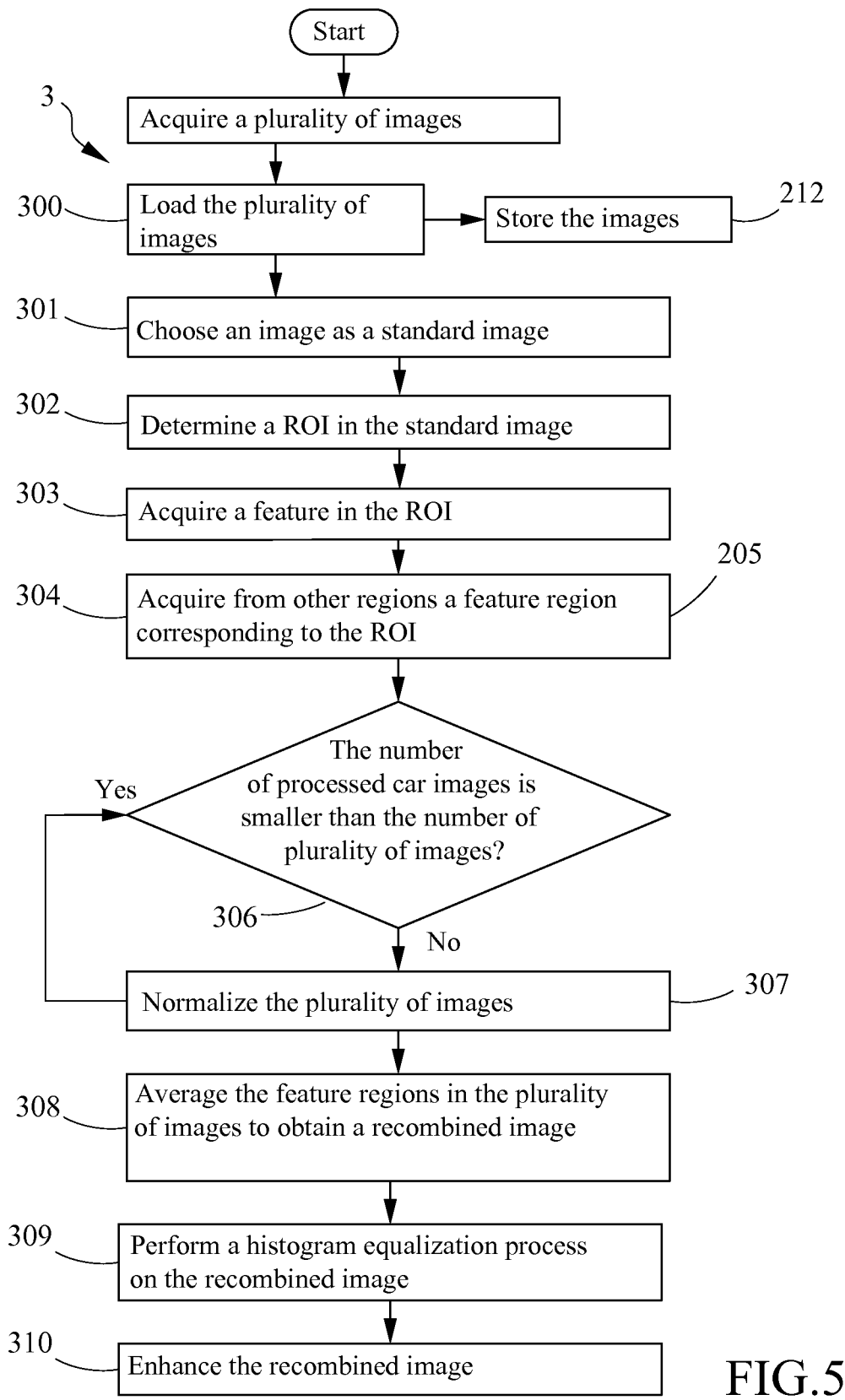
FIG. 5 is a flowchart of a method for image recombination of a plurality of images according to another embodiment of the present invention.
Figure 6A:
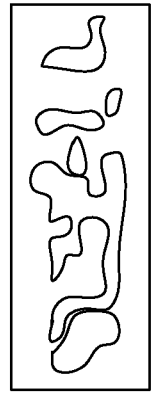
FIG. 6A and FIG. 6B are schematic diagrams of a plurality of images and a recombined image respectively.
Figure 6A:
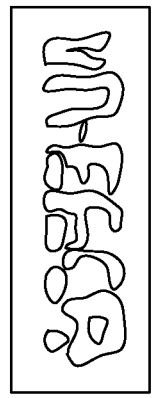
Figure 6A:
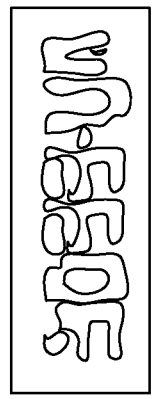
Figure 6B:
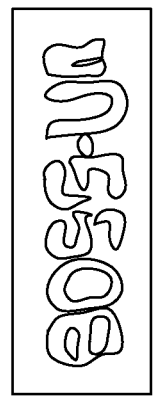
Figures 7A, 7B:
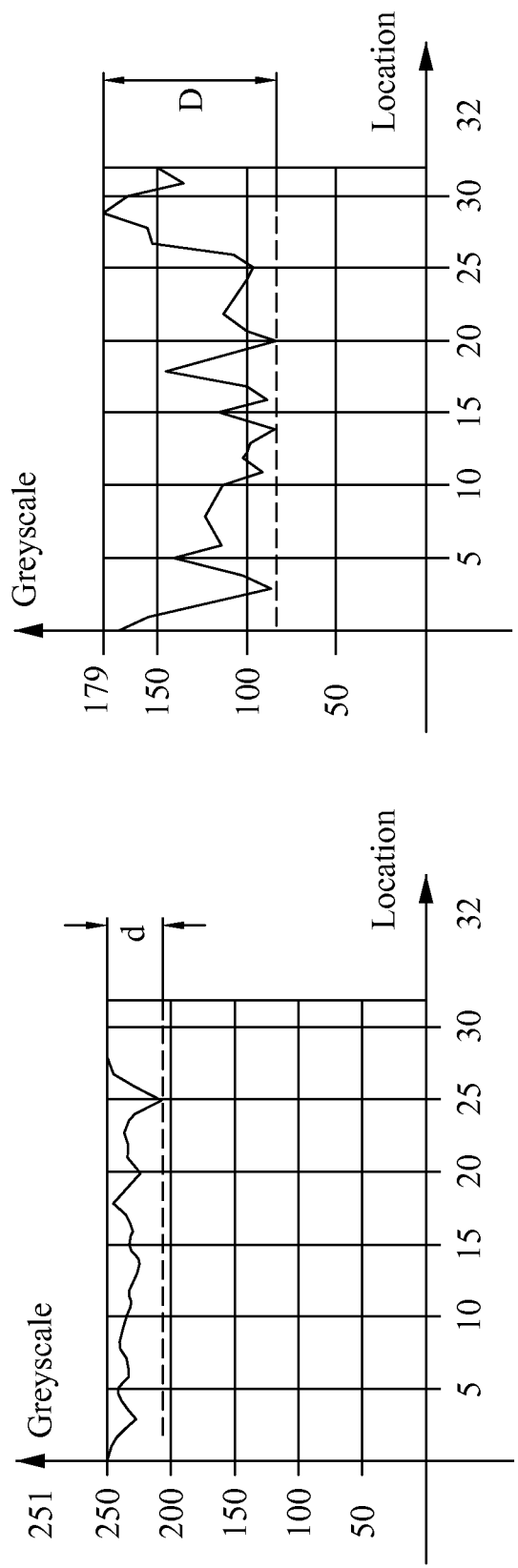
FIG. 7A and FIG. 7B show the greyscale value with respect to the location before and after histogram equalization respectively.

Please refer to FIG. 5, which is a flowchart of a method for image recombination of a plurality of images according to another embodiment of the present invention. In the present embodiment, step 300 to step 307 in the method 3 are similar to step 200 to step 207 in FIG. 1, and descriptions thereof are thus not presented herein. The method 3 in the present embodiment is different from FIG. 1 in that the operation for obtaining the recombined image is different. After normalization in step 307, step 308 is performed to average the feature regions in the plurality of images to obtain a recombined image. Each pixel in the feature region and region of interest is summed and averaged to form the recombined image. Then, in step 309, a histogram equalization process is performed on the recombined image. The histogram equalization process is aimed at enhancing the contrast of the recombined image. For example, FIG. 6A shows unidentified feature regions on a plurality of images (3 images in the present embodiment) before recombination, wherein the features on each image are blur and unclear. After step 308 and step 309 Are performed, a clear image is formed as shown in FIG. 6B. FIG. 7A and FIG. 7B show the greyscale value with respect to the location before and after histogram equalization respectively. It is observed that the contrast difference d is small (FIG. 7A) before the histogram equalization process in step 309, while the contrast difference D is large (FIG. 7B) after the histogram equalization process in step 309. A larger contrast difference D (FIG. 7B) is helpful for image identification. Referring to FIG. 5, step 310 is performed to enhance the features in the recombined image for image identification.

Figure 8:
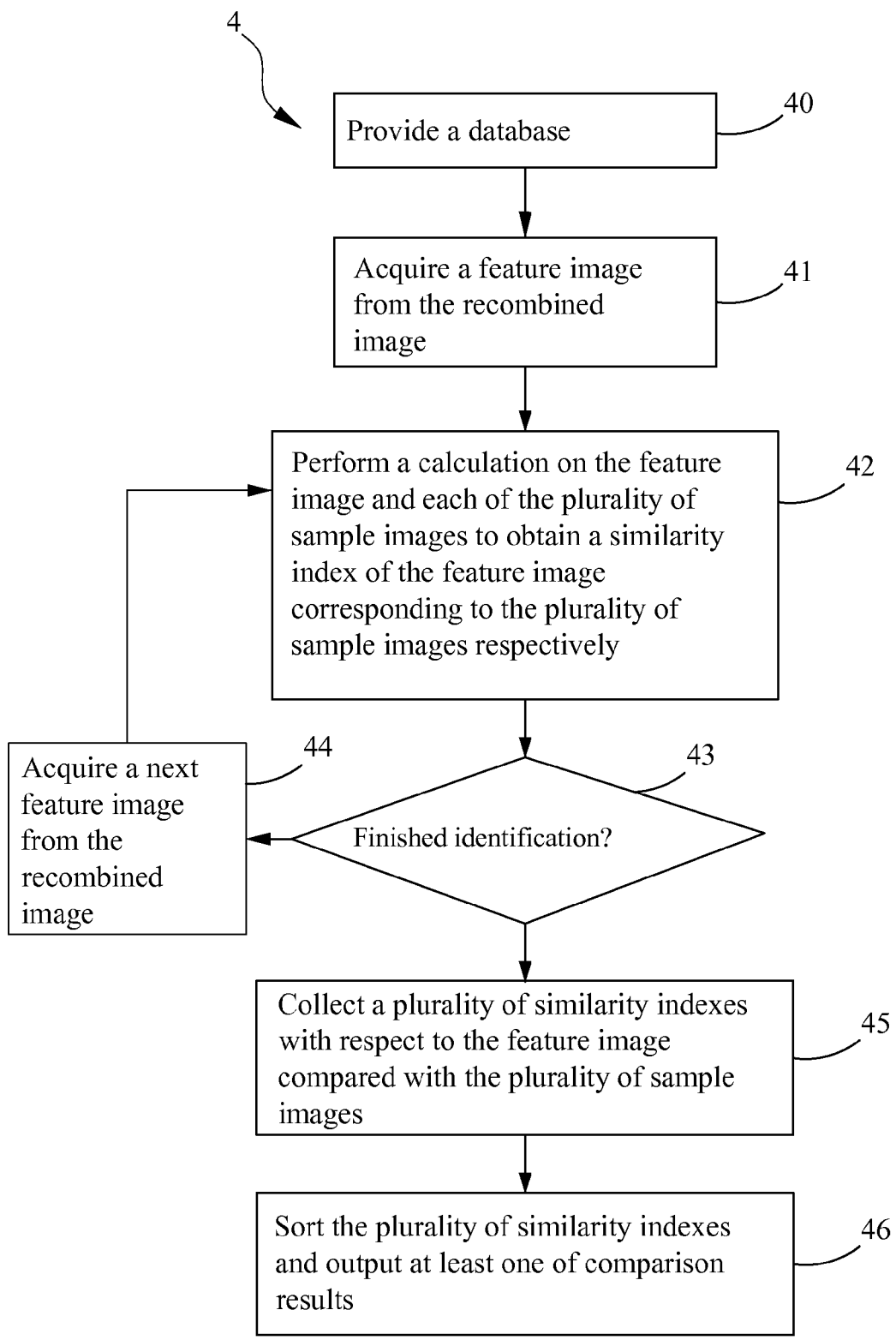
FIG. 8 is a flowchart of a method for image identification according to the present invention.

Please refer to FIG. 8, which is a flowchart of a method for image identification according to the present invention. The flowchart of the method for image identification can be achieved using the recombined image formed in FIG. 1 or FIG. 5 to obtain identification results with respect to the recombined image. In other words, the recombined image formed in FIG. 1 or FIG. 5 is used to obtain information according to the comparison with the plurality of sample images. The method 4 starts with step 40 to provide a database. The database provides a plurality of standard sample images. Please refer to FIG. 9A, which is a schematic diagram of a sample image. The size of the sample image 5 is determined according to the user's demand, for example, 130×130 pixels, but not limited thereto. A standard image region 50 is formed on the pixel in the sample image 5. The standard image region 50 comprises a plurality of pixels 500 and 501 to form a character, a digit, a word or a pattern as represented by the sample image. Referring to FIG. 9B, the present embodiment is exemplified by a digit "1". In the sample image 5, each pixel 500 and 501 is given a proper greyscale value to form a standard image region 50, which draws the outline of the digit 1. Then, in the standard image region 50, specific pixels 501 (pixels with oblique lines) are given a specific weight value. The greyscale value and the weight value are determined according to the user's demand. That is, each weight value may be different or identical. In the present embodiment, the weight value is positive. In the standard image region 50, the greyscale value and the weight value for each pixel 500 and 501 are combined as the first feature value.

Figures 9C, 9D:
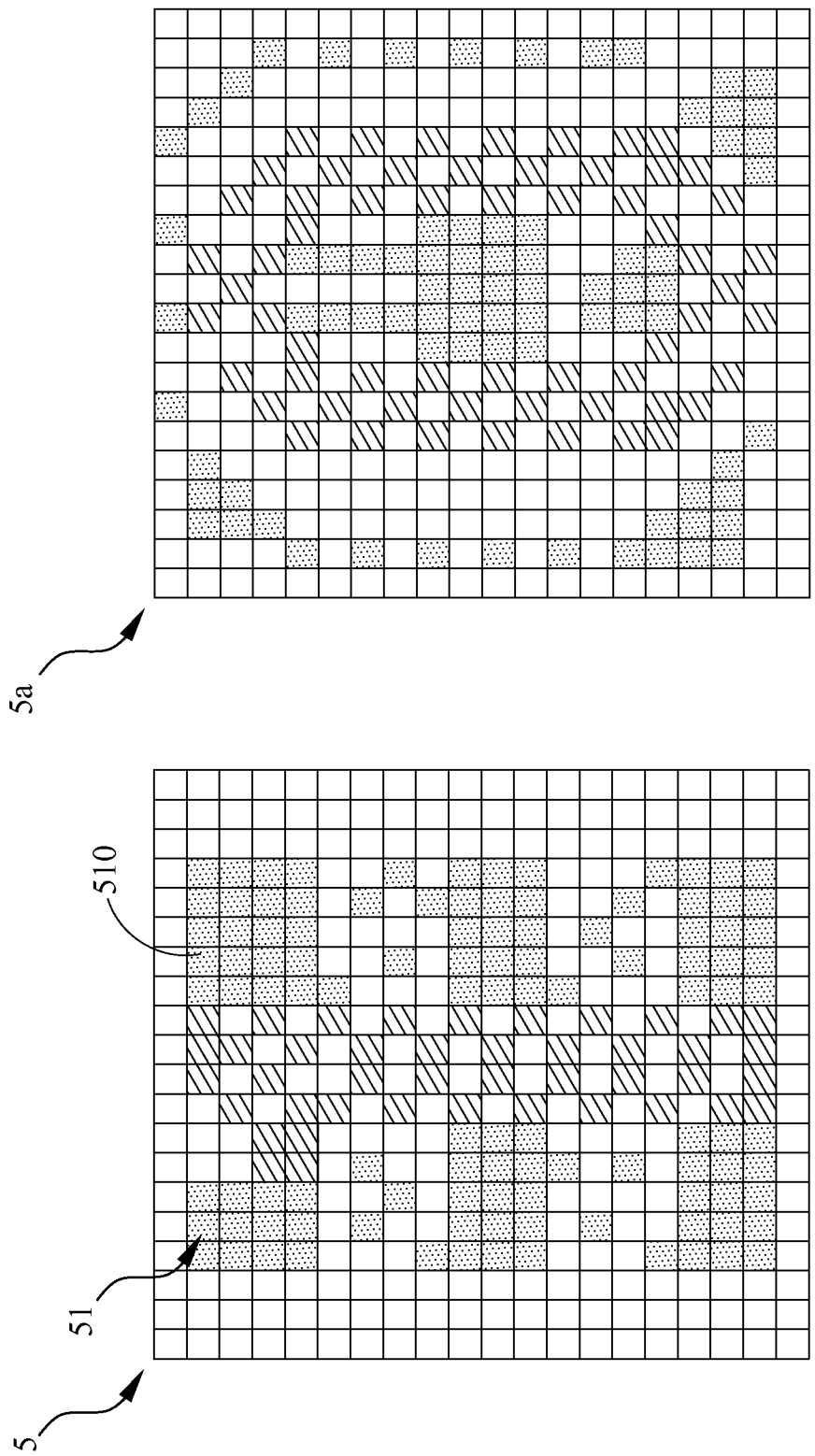

In the sample image, the non-standard image region 51 is provided as shown in FIG. 9C. The non-standard image region 51 represents the content that the standard image region 50 is taken for. For example, digit "1" is often taken for letter "I" or "L" or even letter "E". Therefore, locations for pixels 510 possibly mis-identified (pixels with dots) are given proper greyscale values and weight values as the second feature values corresponding to pixels 510. In the present embodiment, locations for the pixels 510 in the non-standard image region 51 are determined according to the easily mis-identified character, digit or word in the standard image region 50, which is not restricted. The greyscale values and weight values are determined according to practical demand. In the present embodiment, the weight values in the non-standard image region 51 are negative.

As shown in FIG. 9D, which is a schematic diagram showing another sample image 5a provided according to digit 0, the sample image 5a also comprises a standard image region and a non-standard image region. The pattern constructed by the pixels in the standard image region draws the outline of a digit "0". Similarly, the pattern constructed by the pixels in the non-standard image region denotes a word that digit "0" is taken for. For example, digit "0" is often taken for letter "Q" or digit "8". Steps 221 and 222 can be performed using image processing software exemplified by, but not limited to, MS Paint. The sample images, such as 0 to 9, A to Z and a to z, are stored in the database. Then, in step 224, the identification result is observed after a plurality times of training.

Figure 10A:
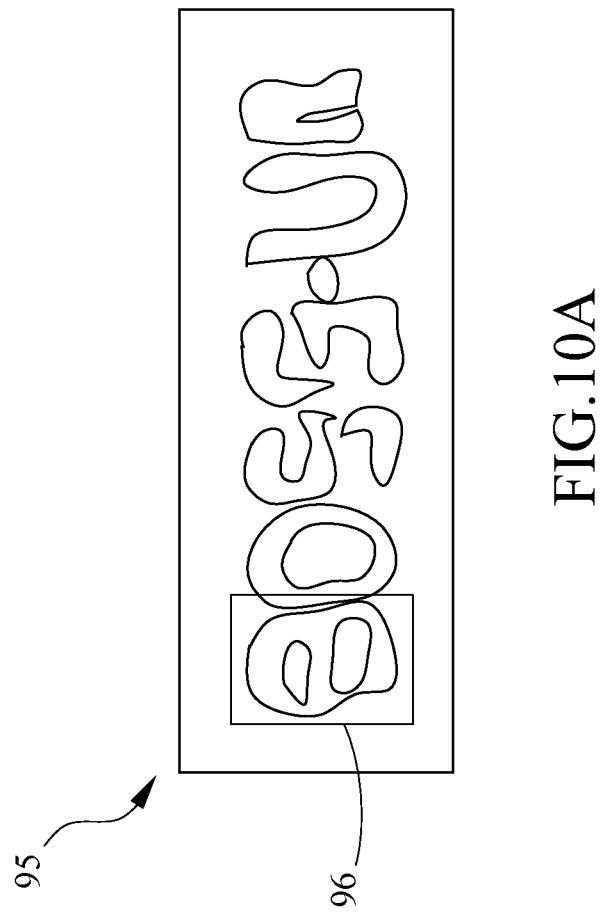
FIG. 10A is a schematic diagram of a recombined image and a feature image thereof.

Referring to FIG. 8, step 41 is performed to acquire a feature image from the recombined image. For example, in FIG. 10A, the region in the recombined image 95 (the image in FIG. 6B) corresponding to each unidentified word is the feature image. In step 41, the acquired feature image 96 is the first character in the identification information. Then, step 42 performs a calculation on a third feature value of each pixel in the feature image and the first feature value or the second feature value corresponding to each pixel in the plurality of sample images to obtain a similarity index of the feature image corresponding to the plurality of sample images respectively.

Figure 10B:
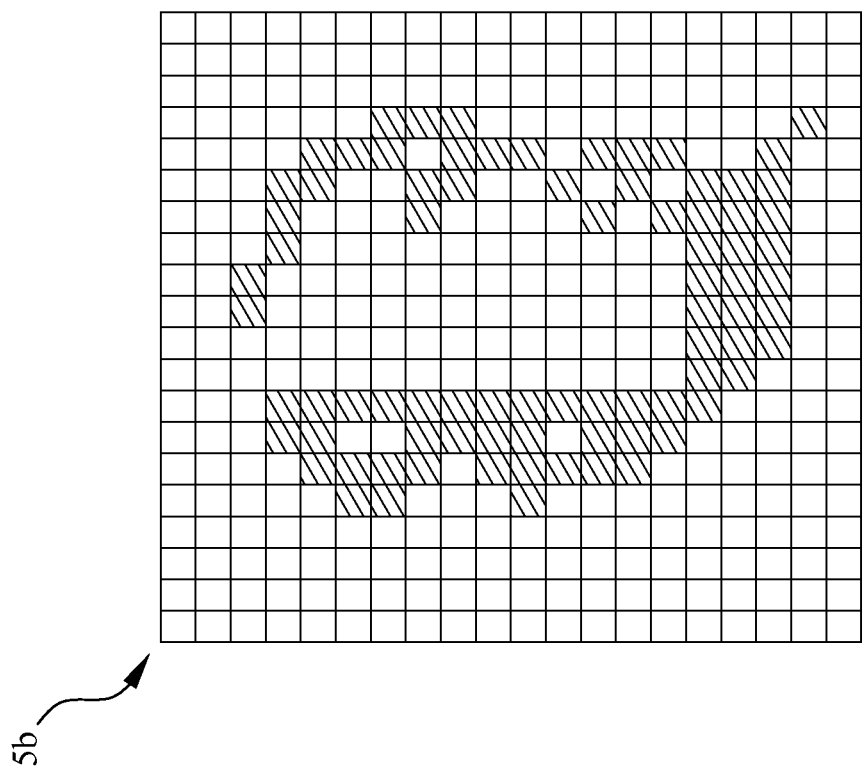
FIG. 10B is a schematic diagram of a feature image.

Please refer to FIG. 10B, which is a schematic diagram showing a feature image 96. The feature image can be processed with each of the sample images for further calculation to obtain a corresponding similarity index $C_{uv}$. The calculation is based on normalized correlation matching, as described in equation (1). Normalized correlation matching is aimed at calculating the relation between the feature image and the sample image, wherein the standard deviation of the greyscale value of each image is regarded as a vector and is multiplied with the weight value so as to determine the optimal location. The standard correlation value is within the range between −1 and 1 with higher similarity as it gets closer to 1. When $C_{uv}$ reaches its maximum, an optimal location is achieved.

$$C_{uv} = \frac{\Sigma(u_i - \bar{u})(v_i - \bar{v}) \times w_i}{[\Sigma(u_i - \bar{u})^2 \Sigma(v_i - \bar{v})^2]^{1/2}} \quad (1)$$

wherein $u_i$ is the greyscale value of each pixel in the sample image, while $v_i$ is the greyscale value of each pixel in the feature image, i.e., the third feature value. Moreover, $\bar{u}$ is the average greyscale value of all the pixels in the sample image, while $\bar{v}$ is the average greyscale value of all the pixels in the feature image. $w_i$ is the weight value of the pixels in the standard image region and the non-standard image region in the sample image. The weight value of pixels in the other region is 1.

Based on equation (1), a calculation is performed on each pixel in FIG. 10B and each pixel in the sample image. For example, FIG. 10B and the sample image in FIG. 9C (representing digit 1) and the sample image in FIG. 9D (representing digit 0) are calculated to obtain the similarity index $C_{uv}$ of the feature image in FIG. 10B corresponding to FIG. 9C and FIG. 9D. Referring to FIG. 8, after obtaining the similarity index, steps 43 and 44 are performed to acquire the feature image from each character in the recombined image 95. Step 42 is then repeated to perform identification. Step 45 collects a plurality of similarity indexes with respect to the feature image compared with the plurality of sample images. In the present step, the similarity indexes are sorted from the identification result with highest possibility to the identification result with lowest possibility. Finally, in step 46, the plurality of similarity indexes are sorted and at least one of comparison results is output.

Referring to FIG. 3B, since there are 7 characters in the identification mark, the result shown in FIG. 11 can be obtained after the flowchart of the method 4 for identification is performed. In FIG. 11, four possible results are shown. Each result represents one possible combination of characters on the license plate. Each character in the first possible result has the highest similarity, which is followed by the second, the third and the fourth possible results. Taking the first possible result for example, the characters on the license plate are possibly 6095-OA, wherein the first character "6" has a similarity index of 72, the second character "0" has a similarity index of 52, the third character "9" has a similarity index of 67, the fourth character "5" has a similarity index of 72, the fifth character is "-", sixth character "O" has a similarity index of 63, and the seventh character "A" has a similarity index of 76. Certainly, the user can also determine other combinations of characters on the license plate number according to the results in FIG. 11 and visual estimation on the image to be identified.

In image identification, images of impossible characters or digits can be excluded according to various combinations that form the identification marks. For example, in one embodiment, the identification mark can be formed as a combination of 4 leading digits and 2 following letters (as shown in FIG. 3A) with a "-" therebetween. In another identification mark, 2 leading letters and 4 following digits are combined, with a "-" therebetween. In the present embodiment, there are two kinds of combinations to exemplify the license plates. Therefore, images of impossible characters or digits can be excluded according to the relative locations of the feature images in the identification mark so as to increase identification efficiency.

Figure 12:
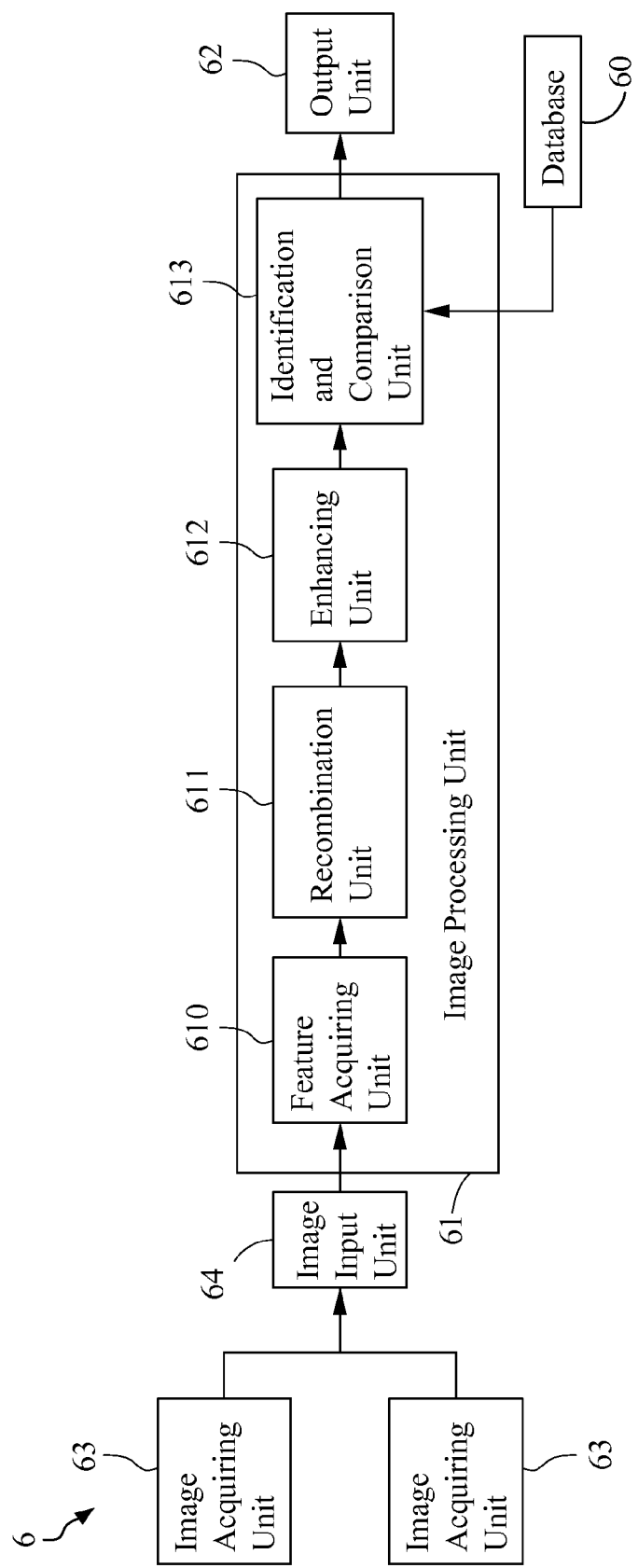
FIG. 12 is a schematic diagram of a system for image acquiring and identification according to the present invention.

Please refer to FIG. 12, which is a schematic diagram of a system for image acquiring and identification according to the present invention. The system 6 is capable of implementing the flowchart in FIG. 1, FIG. 5 or FIG. 8 for image identification and identification result output. The system 6 comprises a database 60, an image processing unit 61, an identification and output unit 62, a plurality of image acquiring units 63 and an image input unit 64. The database 60 is capable of providing a plurality of sample images. The plurality of image acquiring units 63 are electrically connected to the image processing unit 61. Each image acquiring unit 63 is capable of acquiring an image of an object and transmits the image to the image processing unit 61 for identification. In the present embodiment, each of the image acquiring units 63 is capable of acquiring dynamic or static images of the object. The image provides an identification region for carrier identification. The identification region comprises identification information. The image acquiring units may be CCD or CMOS image acquiring units, but not limited thereto. The object may be a carrier with an identification mark thereon, for example, the license plate number of a car. Moreover, the object may also be a word, a character, a digit or combinations thereof.

The image input unit 64 is capable of receiving and transmitting the plurality of images acquired by the image acquiring unit 63 to the image processing unit 61. The image processing unit 61 comprises a feature acquiring unit 610, a recombination unit 611, an enhancing unit 612 and an identification and comparison unit 613. The feature acquiring unit 610 is capable of acquiring features in the region of interest in a standard image and acquiring a feature region corresponding to the region of interest according to acquired features in other regions. The standard image is formed by choosing one image from the plurality of images. The recombination unit 611 performs an image recombination process according to the plurality of feature regions and the region of interest to form a recombined image. The recombined image is formed as disclosed in FIG. 1 or FIG. 5. The enhancing unit 612 is capable of improving the recombined image to enhance the contrast, brightness or the edge features of the recombined image.

The identification and comparison unit 4111 performs step 23 in FIG. 1 to compare the feature image with the sample image to obtain the plurality of similarity indexes corresponding thereto, and sorts the plurality of similarity indexes to output at least one of comparison results. The identification and output unit 42 is electrically connected to the processing unit 41 to output the comparison result identified by the processing unit 41. The output from the identification and output unit 42 is as shown in FIG. 8A, which is capable of allowing the user to know the identification results displayed on a display.

The identification and comparison unit 613 is electrically connected to the enhancing unit 612 to identify the recombined image. The identification and comparison unit 613 performs a calculation on each pixel in the feature image and each pixel in the plurality of sample images to obtain a similarity index of the feature image corresponding to the plurality of sample images respectively according to the flowchart in FIG. 8, and further collects a plurality of similarity indexes with respect to the feature image compared with the plurality of sample images. The output unit 62 is electrically connected to the processing unit 61 to output at least one of comparison results from the processing unit 61.

Accordingly, the present invention discloses a method for image processing and identification and a system for image acquiring and identification with enhanced efficiency and precision. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for image identification, comprising steps of:
   acquiring a plurality of images;
   determining a region of interest in an image from the plurality of images and acquiring features in the region of interest;
   acquiring from other regions, a feature region corresponding to the region of interest according to the acquired features; and
   performing an image recombination process to form a recombined image according to a plurality of feature regions and the region of interest; and
   identifying the recombined image by:
      acquiring at least one feature image in the recombined image, each pixel of the feature image having a third feature value;
      providing a database comprising a plurality of sample images therein, each having respectively a standard image region and at least a non-standard image region such that the standard image region has pixels corresponding to a first feature value respectively, and the non-standard image region has pixels corresponding to a second feature value respectively;
      performing a calculation on the third feature values and the first feature values and the second feature values corresponding to the pixels in the plurality of sample images to obtain similarity indexes of the feature image corresponding to the plurality of sample images respectively;
      collecting the similarity indexes with respect to the feature image compared with the plurality of sample images;
      sorting the similarity indexes; and
      outputting at least one of comparison results which correspond to the sorted similarity indexes,
   wherein the first feature values each include a combination of a positive weight value and a greyscale value,
   wherein the second feature values each include a combination of a negative weight value and a greyscale value,
   wherein the third feature values are each a greyscale value.

2. The method for image identification as recited in claim 1, wherein the calculation is based on normalized correlation matching.

3. The method for image identification as recited in claim 1, wherein each sample image corresponds to an image of a digit or a character.

4. The method for image identification as recited in claim 1, wherein each weight value is determined according to a user's demand.

5. The method for image identification as recited in claim 1, wherein for each respective one of the sample images, a corresponding one of the similarity indexes of the respective one sample image compared with the features image is determined by the formula $$C_{uv} = \frac{\sum (u_i - \overline{u})(v_i - \overline{v}) \times w_i}{[\sum (u_i - \overline{u})^2 \sum (v_i - \overline{v})^2]^{1/2}},$$

where $u_i$ is a respective greyscale value of each pixel in the respective one sample image, including the greyscale values of the first and second feature values of the respective one sample image, where $v_i$ is a respective greyscale value of each pixel in the feature image, including the greyscale values of the third feature values, where $\overline{u}$ is an average greyscale value of all the pixels in the respective one sample image, including the greyscale values of the first and second feature values of the respective one sample image, where $\overline{v}$ is an average greyscale value of all the pixels in the feature image, including the greyscale values of the third feature values, and where $w_i$ is a respective one of the weight values of the pixels in the standard image region and the non-standard image region in the respective one sample image.

6. The method for image identification as recited in claim 1, wherein for each respective one of the sample images, a corresponding one of the similarity indexes of the respective one sample image compared with the feature image, is based upon each of the greyscale values of the first and second feature values of the respective one sample image, the greyscale values of the third feature values, an average greyscale value of all the pixels in the respective one sample image, an average greyscale value of all the pixels in the feature image, and the weight values of the pixels in the standard image region and the non-standard image region in the respective one sample image.

7. A system for image acquiring and identification, comprising:

an image input unit capable of providing a plurality of images;

an image processing unit coupled to the image input unit, the image processing unit further comprising:

a feature acquiring unit capable of acquiring features in a region of interest on an image from the plurality of images and acquiring from other regions a plurality of feature regions corresponding to the region of interest according to the acquired features;

a recombination unit capable of performing an image recombination process according to the plurality of feature regions and the region of interest to form a recombined image, the image processing unit including:

a database comprising a plurality of sample images therein, each having respectively a standard image region and at least a non-standard image region so that the standard image region has pixels corresponding to a first feature value respectively, and the non-standard image region has pixels corresponding to a second feature value respectively; and an identification and comparison unit coupled to the recombination unit to identify the recombined image, the identification and comparison unit performing a calculation on a third feature value of each pixel in a feature image in the recombined image, and the first feature value and the second feature value corresponding to the pixels in the plurality of sample images to obtain similarity indexes of the feature image corresponding to the plurality of sample images respectively, the identification and comparison unit further collecting the similarity indexes with respect to the feature image compared with the plurality of sample images, wherein the first feature values each include a combination of a positive weight value and a greyscale value, wherein the second feature values each include a combination of a negative weight value and a greyscale value, wherein the third feature values are each a greyscale value.

8. The system for image acquiring and identification as recited in claim 7, wherein the image processing unit is further connected to an output unit to sort the similarity indexes and output at least one comparison result which corresponds to one of the similarity indexes.

9. The system for image acquiring and identification as recited in claim 7, wherein each weight value is determined according to a user's demand.

10. The system for image acquiring and identification as recited in claim 7, wherein for each respective one of the sample images, a corresponding one of the similarity indexes of the respective one sample image compared with the features image is determined by the formula $$C_{uv} = \frac{\sum (u_i - \overline{u})(v_i - \overline{v}) \times w_i}{[\sum (u_i - \overline{u})^2 \sum (v_i - \overline{v})^2]^{1/2}},$$

where $u_i$ is a respective greyscale value of each pixel in the respective one sample image, including the greyscale values of the first and second feature values of the respective one sample image, where $v_i$ is a respective greyscale value of each pixel in the feature image, including the greyscale values of the third feature values, where $\overline{u}$ is an average greyscale value of all the pixels in the respective one sample image, including the greyscale values of the first and second feature values of the respective one sample image, where $\overline{v}$ is an average greyscale value of all the pixels in the feature image, including the greyscale values of the third feature values, and where $w_i$ is a respective one of the weight values of the pixels in the standard image region and the non-standard image region in the respective one sample image.

11. The system for image acquiring and identification as recited in claim 7, wherein for each respective one of the sample images, a corresponding one of the similarity indexes of the respective one sample image compared with the feature image, is based upon each of the greyscale values of the first and second feature values of the respective one sample image, the greyscale values of the third feature values, an average greyscale value of all the pixels in the respective one sample image, an average greyscale value of all the pixels in the feature image, and the weight values of the pixels in the standard image region and the non-standard image region in the respective one sample image.

* * * * *